(12) United States Patent
Song et al.

(10) Patent No.: US 12,534,039 B2
(45) Date of Patent: Jan. 27, 2026

(54) PROTECTOR FOR INFLATORS

(71) Applicant: HYUNDAI MOBIS CO., LTD., Seoul (KR)

(72) Inventors: Jiwoon Song, Seongnam-si (KR); Ye Ri Hong, Yongin-si (KR); Chang Ki Son, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/040,395

(22) Filed: Jan. 29, 2025

(65) Prior Publication Data

US 2025/0368156 A1    Dec. 4, 2025

(30) Foreign Application Priority Data

May 29, 2024   (KR) .................. 10-2024-0070266

(51) Int. Cl.
*B60R 21/261*    (2011.01)
*B60R 21/217*    (2011.01)
*B60R 21/231*    (2011.01)

(52) U.S. Cl.
CPC ........ *B60R 21/231* (2013.01); *B60R 21/2171* (2013.01); *B60R 21/261* (2013.01); *B60R 2021/2612* (2013.01)

(58) Field of Classification Search
CPC ... B60R 21/261; B60R 21/2171; B60R 21/26; B60R 21/262; B60R 21/217; B60R 2021/2612; B60R 2021/23123
USPC ....................... 280/736, 740, 742
See application file for complete search history.

(56) References Cited

U.S. PATENT DOCUMENTS

| | | | | |
|---|---|---|---|---|
| 5,308,108 A | * | 5/1994 | Rion | B60R 21/201 280/740 |
| 5,613,704 A | * | 3/1997 | White, Jr. | B60R 21/2176 280/740 |
| 5,918,898 A | * | 7/1999 | Wallner | B60R 21/261 280/740 |
| 8,220,828 B2 | * | 7/2012 | Fukawatase | B60R 21/203 280/775 |
| 11,214,219 B2 | * | 1/2022 | Ono | B60R 21/2171 |
| 11,572,030 B1 | * | 2/2023 | Parkinson | B60R 21/261 |
| 2002/0180194 A1 | * | 12/2002 | Smith | B60R 21/261 280/736 |
| 2003/0001371 A1 | * | 1/2003 | Wackenroder | B60R 21/26 280/742 |
| 2005/0194771 A1 | * | 9/2005 | Clark | B60R 21/261 280/736 |
| 2005/0248134 A1 | * | 11/2005 | Heigl | B60R 21/261 280/730.2 |

(Continued)

FOREIGN PATENT DOCUMENTS

| | | | | |
|---|---|---|---|---|
| CN | 208232994 U | * | 12/2018 | |
| DE | 202017105660 U1 | * | 9/2017 | ............ B60R 21/26 |

*Primary Examiner* — Keith J Frisby
(74) *Attorney, Agent, or Firm* — NSIP Law

(57) ABSTRACT

An apparatus including an inflator having gas holes formed therein, the gas being formed around an outer surface thereof and configured to discharge gas and a protector configured to surround the inflator and configured to have gas discharge spaces defined therein, the gas discharge spaces being configured to include a closed cross-sectional structure to conform with the gas holes to supply the gas to an airbag cushion through respective openings at both ends of the gas discharge spaces.

8 Claims, 4 Drawing Sheets

(56) References Cited

U.S. PATENT DOCUMENTS

| | | | | |
|---|---|---|---|---|
| 2008/0007035 | A1* | 1/2008 | Acker | B60R 21/261 |
| | | | | 280/742 |
| 2011/0316263 | A1* | 12/2011 | Lunt | B60R 21/261 |
| | | | | 280/730.2 |
| 2011/0316264 | A1* | 12/2011 | Maruyama | B60R 21/2171 |
| | | | | 280/730.2 |
| 2014/0062072 | A1* | 3/2014 | Acker | B60R 21/261 |
| | | | | 280/740 |
| 2014/0265262 | A1* | 9/2014 | Witt, Jr. | B60R 21/262 |
| | | | | 280/740 |
| 2017/0036640 | A1* | 2/2017 | Tonooka | B60R 21/2171 |
| 2022/0001826 | A1* | 1/2022 | Disam | B60R 21/262 |

* cited by examiner

PROTECTOR FOR INFLATORS

CROSS-REFERENCE TO THE RELATED APPLICATION

This application claims the benefit under 35 USC § 119(a) of Korean Patent Application No. 10-2024-0070266, filed on May 29, 2024, in the Korean Intellectual Property Office, the entire disclosure of which is incorporated herein by reference for all purposes.

BACKGROUND

1. Field of the Invention

The present disclosure relates to a protector for inflators that may improve an assembly structure between an inflator and a protector to effectively suppress damage to an airbag cushion caused by high-temperature gas.

2. Description of the Related Art

An inflator configured to supply gas to the inside of an airbag cushion is installed in an airbag module.

Accordingly, when a vehicle collision accident occurs, a sensor detects the accident and quickly supplies gas to the airbag cushion through the inflator, thereby instantly deploying the airbag cushion and protecting passengers from the impact of the vehicle.

Further, when the inflator detects a signal from the sensor, the inflator instantly explodes and ignites a gas generator by an ignition device to generate gas.

However, since the gas generated through the inflator is high-temperature and high-pressure gas, there is a problem that the airbag cushion may be damaged if the gas comes into direct contact with the airbag cushion.

Therefore, a protector may be assembled at a connection part between the inflator and the airbag cushion to prevent the gas from coming into direct contact with the airbag cushion.

The matters described in this Background section are only for enhancement of understanding of the background of the disclosure, and should not be taken as an acknowledgement that they correspond to prior art already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided an apparatus including an inflator having gas holes formed therein, the gas being formed around an outer surface thereof and configured to discharge gas and a protector configured to surround the inflator and configured to have gas discharge spaces defined therein, the gas discharge spaces being configured to include a closed cross-sectional structure to conform with the gas holes to supply gas to an airbag cushion through respective openings at both ends of the gas discharge spaces.

The protector may include a central support configured to be supported by an outer surface of a first side of the inflator, side covers connected to both ends of the central support and configured into a shape configured to cover the gas holes at positions spaced apart from the gas holes, and end supports respectively connected to respective side covers and configured to be supported by an outer surface of a second side of the inflator.

The central support may be formed in a shape of a flat plate, a center of the central support being configured to support the inflator, the side covers may be configured into a shape configured to bend from the central support along the inflator to surround the outer surface of the inflator, and the end supports may be configured into a shape configured to bend from the side covers toward the inflator, the outer surface of the inflator being configured to support respective ends of the end supports.

Beads may be formed at corners of the protector configured such that the central support and the side covers are connected.

The side covers may be configured into an arc shape corresponding to a curvature of the outer surface of the inflator so that the gas discharge spaces are formed in the arc shape.

Inner surfaces of connection parts between the side covers and the end supports may be configured into a concave curved shape.

An outer diameter of the inflator may be greater than or equal to an inner diameter of an inscribed circle inscribed in the central support and the ends of the end supports.

An outer diameter of the inflator may be greater than or equal to a width of a slot formed between the end supports.

An outer diameter of the protector may be greater than or equal to an outer diameter of the inflator.

A stud may be coupled to the inflator, the protector may include a stud hole formed therein, and the stud may be inserted into the stud hole while the inflator is assembled with the protector.

Figure 1:
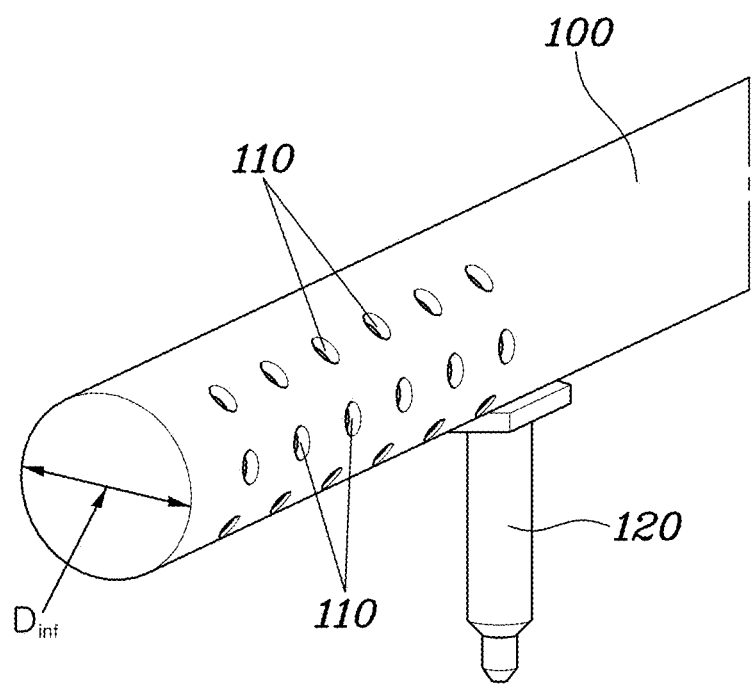
FIG. 1 is a perspective view showing an inflator and a protector according to the present disclosure that are separated from each other.
Figure 1:
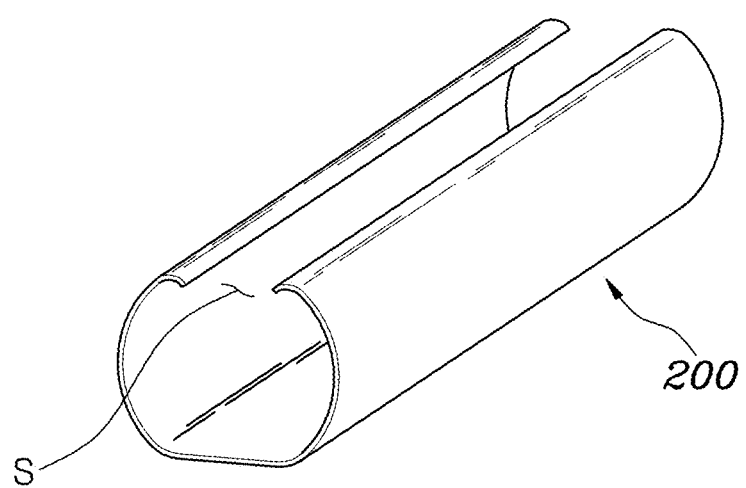

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

A protector for inflators according to the present disclosure includes an inflator 100 configured to have gas holes 110 formed around the outer surface thereof to discharge gas, and a protector 200 assembled in a shape that surrounds the inflator 100 and configured to have gas discharge spaces A of a closed cross-sectional structure with the gas holes 110 to supply the gas to an airbag cushion through openings at both ends of the gas discharge spaces A.

Figure 2:
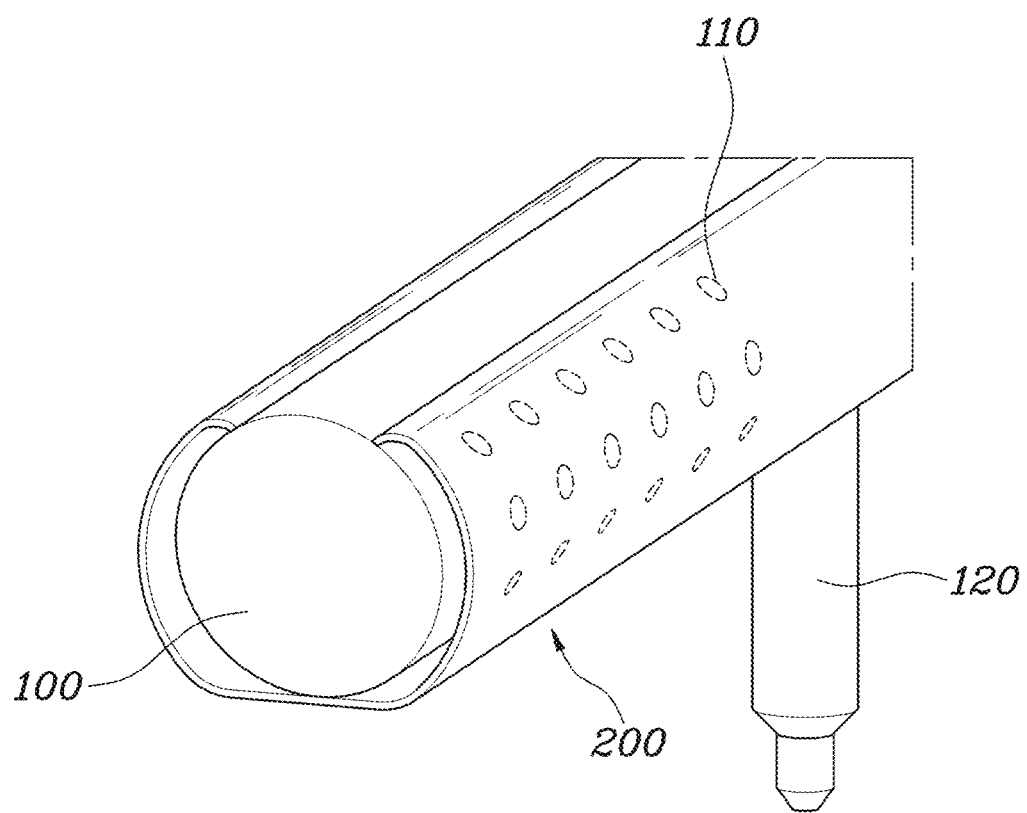
FIG. 2 is a perspective view showing the inflator and the protector according to the present disclosure that are assembled.
Figure 3:
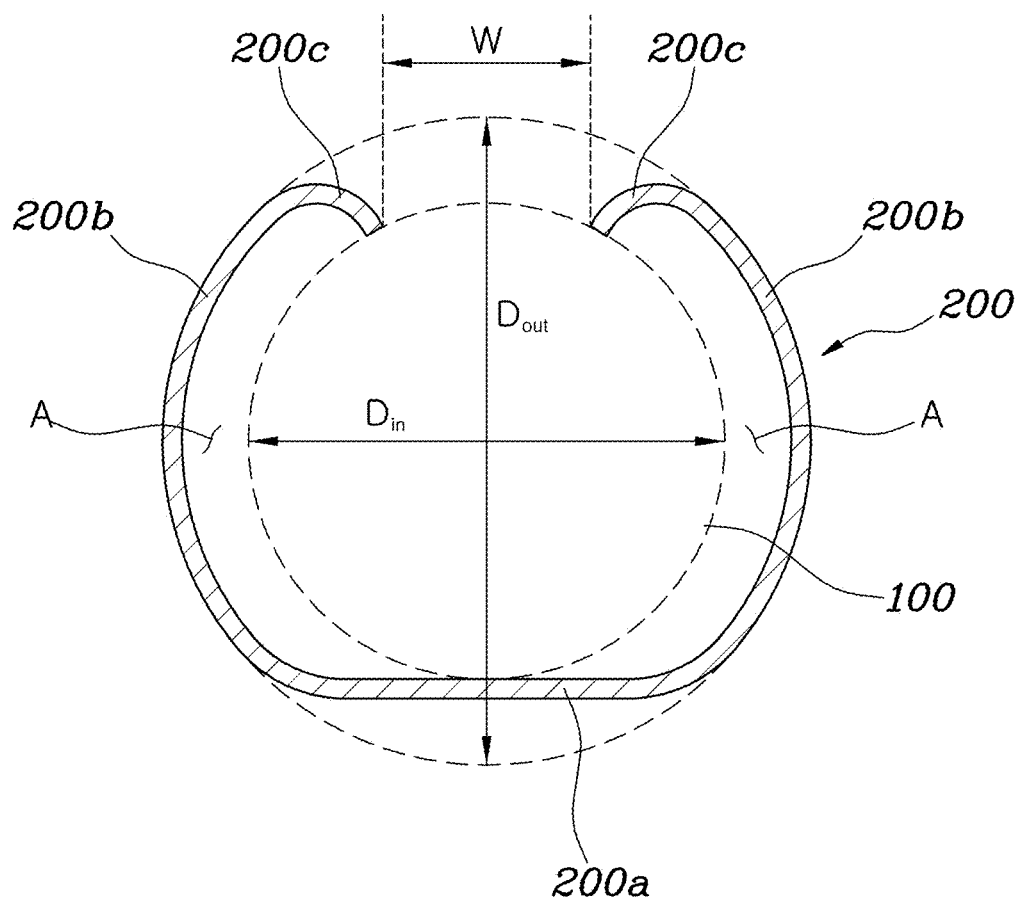
FIG. 3 is a cross-sectional view of an assembly of the inflator and the protector according to the present disclosure.
Figure 4:
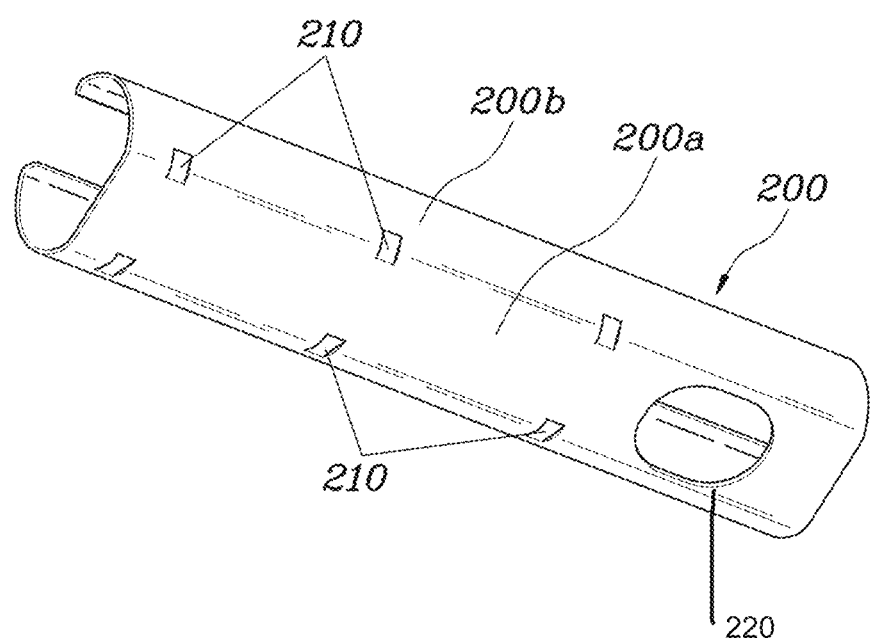
FIG. 4 is a perspective view showing beads and a stud hole formed on and in the protector according to the present disclosure.

Referring to FIGS. 1 to 3, the inflator 100 is formed in a cylindrical shape, and a plurality of gas holes 110 is formed at regular intervals in some length sections of the inflator 100 in the length direction of the inflator 100 so that gas is discharged through each gas hole 110.

The protector 200 is formed in a shape that covers the gas holes 110 at a position spaced apart from the gas holes 110 by a predetermined distance in an area where the gas holes 110 are formed, so that the gas discharge spaces A are formed between the gas holes 110 and the protector 200.

Particularly, since portions of the protectors 200 forming the inner surfaces of the gas discharge spaces A are supported by the outer surface of the inflator 100, the gas discharge spaces A may have the closed cross-sectional shape.

In addition, the openings are formed at both ends of the gas discharge spaces A, and gas is discharged through the openings and is supplied to the airbag cushion.

That is, the gas discharged from the inflator 100 is first discharged into the gas discharge spaces A formed as having the closed cross-section and then supplied to the airbag cushion so that the airbag cushion is prevented from being damaged by the high-temperature gas, and the gas is cooled in a process of flowing through the gas discharge spaces A to more stably prevent damage to the airbag cushion.

In addition, in the present disclosure, the protector 200 includes a central support 200a supported by the outer surface of one side of the inflator 100, side covers 200b connected to both ends of the central support 200a and formed in the shape that covers the gas holes 110 at positions spaced apart from the gas holes 110, and end supports 200c connected to the side covers 200b and supported by the outer surface of the other side of the inflator 100.

Furthermore, in the present disclosure, the central support 200a is formed in the shape of a flat plate so that the inflator 100 is supported by the center thereof, the side covers 200b are formed in a shape that bends from the central support 200a along the inflator 100 to surround the outer surface of the inflator 100, and the end supports 200c are formed in a shape that bends from the side covers 200b toward the inflator 100 so that the ends of the end supports 200c are supported by the outer surface of the inflator 100.

Referring to FIG. 3, the protector 200 is formed to have an approximately C-shaped cross-section, the flat central support 200a is formed in the middle of the protector 200, and the center of the inner surface of the central support 200a is supported in a state of being in linear contact with the outer surface of one side of the inflator 100.

The side covers 200b are formed to extend in shapes bilaterally symmetrical to each other from both ends of the central support 200a, and connection parts between the central support 200a and the side covers 200b are bent so that the side covers 200b are bent along the outer surface of the inflator 100 to surround the left and right outer surfaces of the inflator 100 at positions spaced apart from the gas holes 110.

In addition, the end supports 200c are formed to extend in shapes bilaterally symmetrical to each other from the side covers 200b, and connection parts between the side covers 200b and the end supports 200c are bent so that the ends of the end supports 200c, i.e., the left and right ends of the protector 200, are bent toward the outer surface of the inflator 100, and the end supports 200c are supported in a state of being in linear contact with the outer surface of the other side of the inflator 100.

That is, the inner surface of the center of the inner surface of the central support 200a and both ends of the end supports 200c are supported by the outer surface of the inflator 100, and the side covers 200b are provided at positions spaced apart from the outer surface of the inflator 100, thereby forming the gas discharge spaces A of the closed cross-sectional structure between the inner surfaces of the central support 200a, the side covers 200b, and the end supports 200c and the outer surface of the inflator 100.

Accordingly, since gas discharged from the inflator 100 is first discharged into the gas discharge spaces A and then supplied to the airbag cushion, the airbag cushion is prevented from being damaged by the high-temperature gas.

In addition, in the present disclosure, beads 210 may be formed at the corners of the protector 200 where the central support 200a and the side covers 200b are connected.

The beads 210 may be formed by partially pressing the corners into the inside of the protector 200, and as the beads 210 are formed, bending or breaking of the side covers 200b with respect to the central support 200a may be alleviated.

Therefore, a gap between the side covers 200b may be prevented from being widened by the discharge pressure of gas discharged through the gas holes 110 as much as possible, thereby preventing the high-temperature gas from directly contacting the airbag cushion and preventing damage to the airbag cushion caused by the high-temperature gas.

Here, a plurality of beads 210 may be formed along the corners where the central support 200a and the side covers 200b are connected, and the beads 210 may be formed at positions that are bilaterally symmetrical to each other, or in some cases, may be formed at positions that are asymmetrical.

Further, in the present disclosure, the side covers 220b may be formed in an arc shape corresponding to the curvature of the outer surface of the inflator 100, and thus, the gas discharge spaces A may be formed in the arc shape.

That is, the inner surfaces of the side covers 220b are formed at positions that are concentric with the outer surface of the inflator 100, and thus, the gas discharge spaces A formed between the side covers 220b and the inflator 100 may be formed in the arc shape.

Therefore, gas discharged through the gas holes 110 is discharged while flowing along the inner surfaces of the gas discharge spaces A, and thereby, a cooling effect on the gas may be exhibited.

However, the gas discharge spaces 200 may be formed such that areas near the end supports 200c are narrower than areas near the central support 200a, or conversely, the areas near the central support 200a are narrower than the areas near the end supports 200c by changing the shape of the protector 200, and the end supports 200c may be configured to withstand more sturdily the discharge pressure of the gas without widening a gap between the end supports 200c due to the discharge pressure of the gas by adjusting the shape of the gas discharge spaces A.

Further, in the present disclosure, the inner surfaces of the connection parts between the side covers 220b and the end supports 220c may be bent into a concave curved shape.

Accordingly, when gas discharged through the gas holes 110 flows to the end supports 200c along the inner surfaces of the side covers 200b, the gas flows along the concave inner surfaces of the end supports 200c, thereby being capable of minimizing widening of the gap between the end supports 200c due to the discharge pressure of the gas.

Further, in the present disclosure, the outer diameter $D_{inf}$ of the inflator 100 may be greater than or equal to the inner diameter $D_{in}$ of an inscribed circle that is inscribed in the central support 200a and the ends of the end supports 200c.

In addition, the outer diameter $D_{out}$ of the protector 200 may be greater than or equal to the outer diameter $D_{inf}$ of the inflator 100.

The relationship among these diameters may be expressed as an inequality as follows.

$$D_{out} \geq D_{inf} \geq D_{in}$$

$D_{out}$: Outer diameter of protector
$D_{inf}$: Outer diameter of inflator
$D_{in}$: Inner diameter of inscribed circle in protector Particularly, the outer diameter $D_{inf}$ of the inflator 100 should be greater than the inner diameter $D_{in}$ of the inscribed circle.

Accordingly, when the inflator 100 is coupled to the inside of the protector 200, the central support 200a and the end supports 200c may be supported while being pressed against the outer surface of the inflator 100 so that the inflator 100 and the protector 200 may be firmly coupled.

In addition, the outer diameter $D_{out}$ of the protector 200 should be greater than the outer diameter $D_{inf}$ of the inflator 100.

Accordingly, the inflator 100 may be coupled to the protector 200 while being inserted into the protector 200.

Further, the outer diameter $D_{inf}$ of the inflator 100 may be greater than or equal to the width W of a slot S formed between the end supports 200c.

Particularly, the outer diameter $D_{inf}$ of the inflator 100 should be greater than the width W of the slot S.

Therefore, when the inflator 100 is pressed into the slot S to couple the inflator 100 to the protector 200, the inflator 100 is inserted into the protector 200 as the width W of the slot S is expanded through elastic deformation, the width W of the slot S that has been expanded during the insertion process is narrowed, and the end supports 200c are pressed and supported by the inflator 100, thereby being capable of maintaining the firmly coupled state of the inflator 100 to the protector 200.

Further, in the present disclosure, a stud 120 may be coupled to the inflator 100, a stud hole 220 may be formed in the protector 200, and the stud 120 may be inserted into the stud hole 220 while the inflator 100 is assembled with the protector 200.

That is, the stud 120 is inserted into and coupled to the stud hole 220 at the same time as coupling of the inflator 100 to the inside of the protector 200, thereby improving convenience of assembling the inflator 100 and the protector 200.

For reference, in the present disclosure, the protector 200 may be formed in a shape in which the end supports 200c and the side covers 200b are removed, in an area corresponding to a portion of the inflator 100 where the gas holes 110 are not formed.

In this case, fastening force required to insert the inflator 100 to the protector 200 is reduced, and thus, assemblability between the protector 200 and the inflator 100 may be improved.

As described above, in the present invention, gas discharged from the inflator 100 is first discharged into the gas discharge spaces A formed as having the closed cross-section and then supplied to the airbag cushion so that the airbag cushion is prevented from being damaged by the high-temperature gas, and the gas is cooled in the process of flowing through the gas discharge spaces A to more stably prevent damage to the airbag cushion.

As is apparent from the above description, according to the present disclosure, gas discharged from an inflator is first discharged into gas discharge spaces formed as having a closed cross-section and then supplied to an airbag cushion so that an airbag cushion is prevented from being damaged by the high-temperature gas, and the gas is cooled in a process of flowing through the gas discharge spaces A to more stably prevent damage to the airbag cushion.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus, comprising:
   an inflator having gas holes formed therein, the gas holes being formed around an outer surface thereof and configured to discharge gas; and
   a protector configured to surround the inflator and configured to have a plurality of gas discharge spaces defined therein, each of the gas discharge spaces being configured to include a closed cross-sectional structure to conform with the gas holes to supply gas to an airbag cushion through respective openings at both ends of the gas discharge spaces,
   wherein the protector comprises:
   a central support configured to be supported by an outer surface of a first side of the inflator,
   side covers connected to both ends of the central support and configured into a shape configured to cover the gas holes at positions spaced apart from the gas holes, and
   end supports respectively connected to respective side covers and configured to be supported by an outer surface of a second side of the inflator,
   wherein the central support is formed in a shape of a flat plate, a center of the central support being configured to support the inflator,
   wherein the side covers are configured into a shape configured to bend from the central support along the inflator to surround the outer surface of the inflator, and
   wherein the end supports are configured into a shape configured to bend from the side covers toward the inflator, the outer surface of the inflator being configured to support respective ends of the end supports.

2. The apparatus of claim 1, wherein beads are formed at corners of the protector configured such that the central support and the side covers are connected.

3. The apparatus of claim 1, wherein the side covers are configured into an arc shape corresponding to a curvature of the outer surface of the inflator so that the gas discharge spaces are formed in the arc shape.

4. The apparatus of claim 1, wherein inner surfaces of connection parts between the side covers and the end supports are configured into a concave curved shape.

5. The apparatus of claim 1, wherein an outer diameter of the inflator is greater than or equal to a width of a slot formed between the end supports.

6. The apparatus of claim 1, wherein an outer diameter of the protector is greater than or equal to an outer diameter of the inflator.

7. The apparatus of claim 1, wherein a stud is coupled to the inflator,
   wherein the protector includes a stud hole formed therein, and
   wherein the stud is inserted into the stud hole while the inflator is assembled with the protector.

8. An apparatus, comprising:
   an inflator having gas holes formed therein, the gas holes being formed around an outer surface thereof and configured to discharge gas; and
   a protector configured to surround the inflator and configured to have a plurality of gas discharge spaces defined therein, each of the gas discharge spaces being configured to include a closed cross-sectional structure to conform with the gas holes to supply gas to an airbag cushion through respective openings at both ends of the gas discharge spaces,
   wherein the protector comprises;
   a central support configured to be supported by an outer surface of a first side of the inflator,
   side covers connected to both ends of the central support and configured into a shape configured to cover the gas holes at positions spaced apart from the gas holes, and
   end supports respectively connected to respective side covers and configured to be supported by an outer surface of a second side of the inflator,
   wherein an outer diameter of the inflator is greater than or equal to an inner diameter of an inscribed circle inscribed in the central support and the ends of the end supports.

* * * * *